US007926762B2

(12) United States Patent
Oetken et al.

(10) Patent No.: US 7,926,762 B2
(45) Date of Patent: Apr. 19, 2011

(54) CARGO-HOLD FLOOR FOR AIRCRAFT

(75) Inventors: Axel Oetken, Ganderkesee (DE); Berthold Eitzenberger, Ludwigshafen (DE)

(73) Assignee: PFW Aerospace AG, Speyer (DE)

( * ) Notice: Subject to any disclaimer, the term of this patent is extended or adjusted under 35 U.S.C. 154(b) by 1141 days.

(21) Appl. No.: 10/559,926

(22) PCT Filed: Feb. 10, 2005

(86) PCT No.: PCT/EP2005/001324
§ 371 (c)(1),
(2), (4) Date: Jan. 4, 2007

(87) PCT Pub. No.: WO2005/077755
PCT Pub. Date: Aug. 25, 2005

(65) Prior Publication Data
US 2007/0095978 A1 May 3, 2007

(30) Foreign Application Priority Data

Feb. 11, 2004 (DE) .......................... 10 2004 006 648

(51) Int. Cl.
*B64C 1/20* (2006.01)
(52) U.S. Cl. .................... 244/118.1; 244/137.1; 410/106
(58) Field of Classification Search .............. 244/117 R, 244/118.1, 137.1, 137.3, 118.6; 410/101, 410/106
See application file for complete search history.

(56) References Cited

U.S. PATENT DOCUMENTS 4,077,590 A * 3/1978 Shorey ............................ 410/77
6,138,975 A * 10/2000 McDaid ......................... 248/499

FOREIGN PATENT DOCUMENTS

| DE | 11 22 379 B | 1/1962 |
| EP | 0 816 224 A | 1/1998 |

* cited by examiner

*Primary Examiner* — Timothy D Collins
*Assistant Examiner* — Brian M O'Hara
(74) *Attorney, Agent, or Firm* — Birch, Stewart, Kolasch & Birch, LLP

(57) ABSTRACT

The invention relates to a cargo-hold floor for aircraft which is received on a grid structure (1). The grid structure (1) comprises essentially longitudinal members (2) and crossmembers (3). Exchangeably arranged floor plates (80), furthermore roller conveyor apparatuses (50) and lashing points (10) for the fastening of cargo articles, such as pallets, containers or vehicles, are received on the grid structure (1). Furthermore, locking units (98) are provided, which comprise lock elements (100) capable of being folded open and of being folded away. The lashing points (10) are located at the intersection points of the longitudinal members (2) and of the crossmembers (3). The roller conveyor apparatuses (50) and the locking units (98) are always located at the same installation location both in their erected position and in their countersunk drive-over and stowage position.

21 Claims, 9 Drawing Sheets

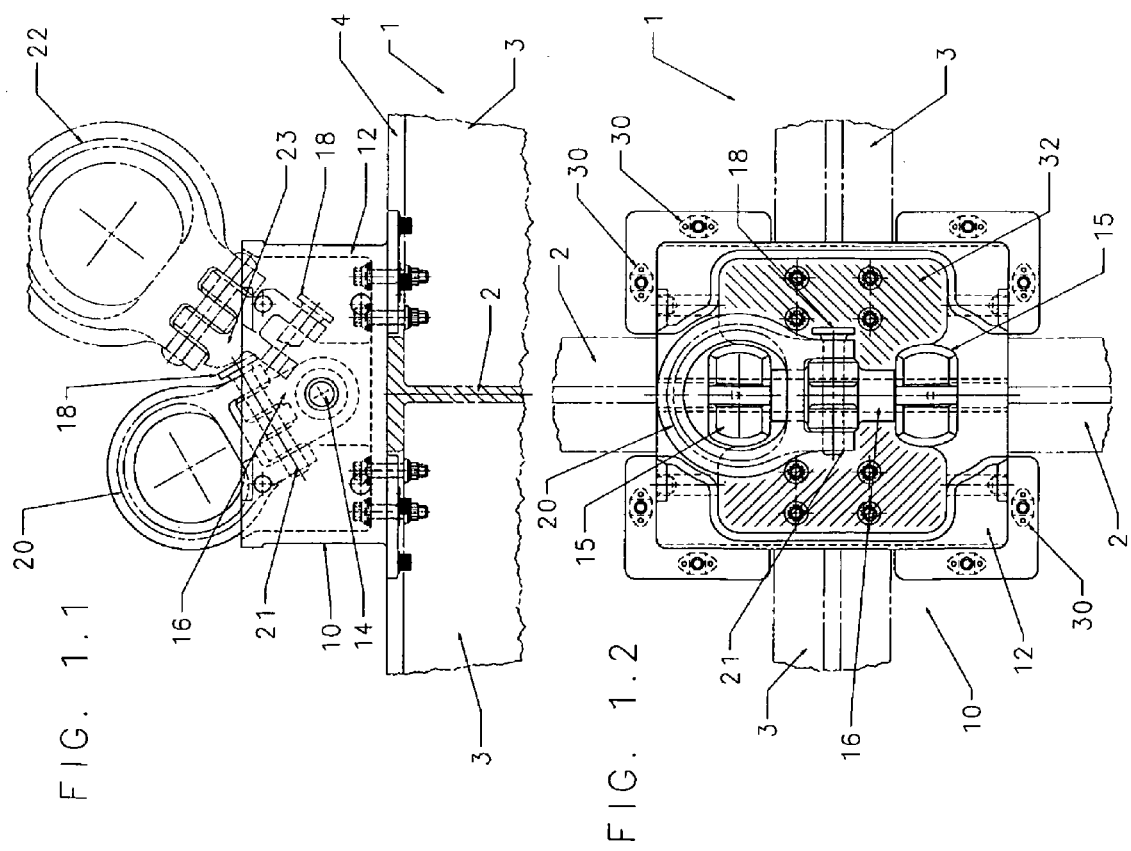

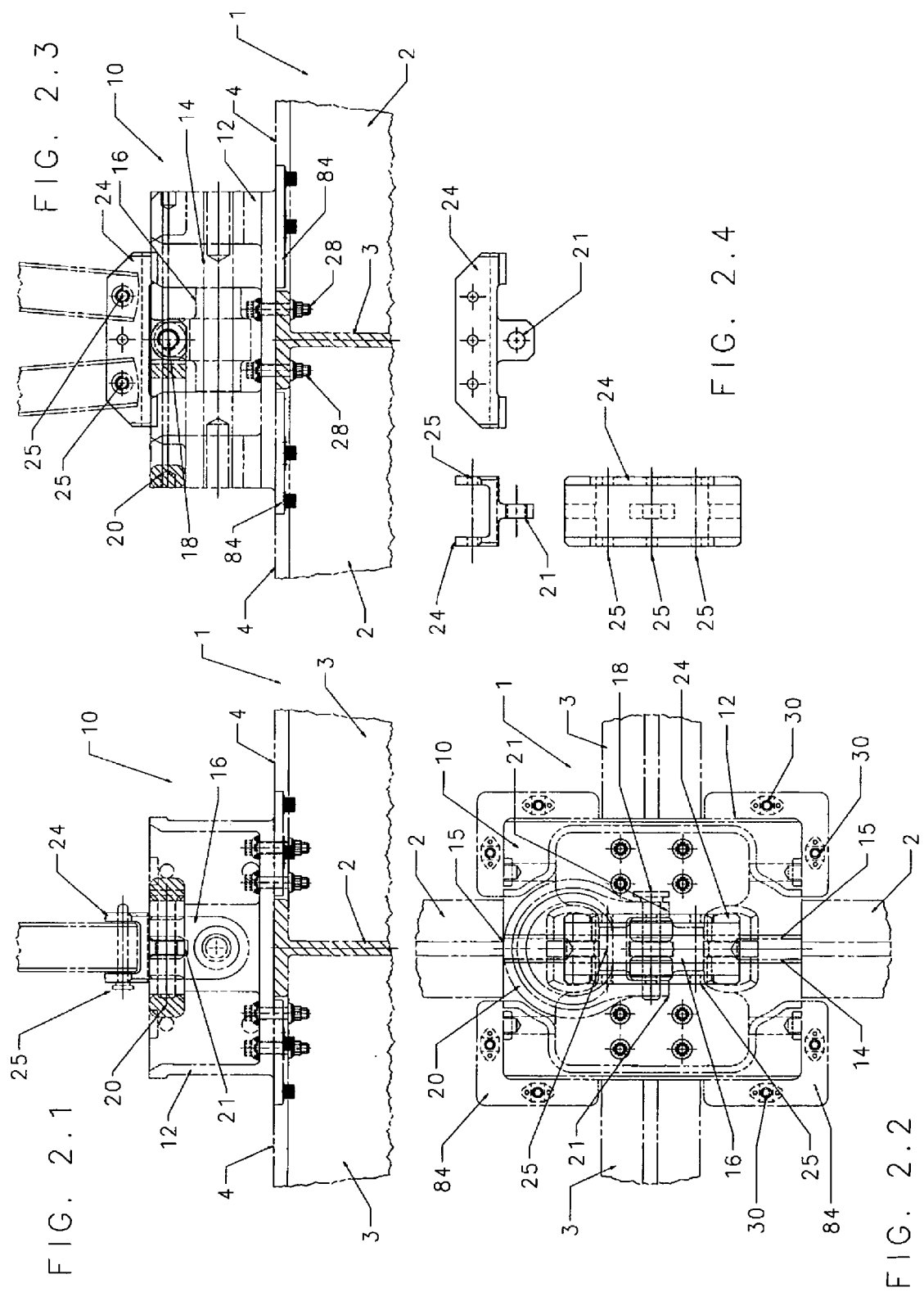

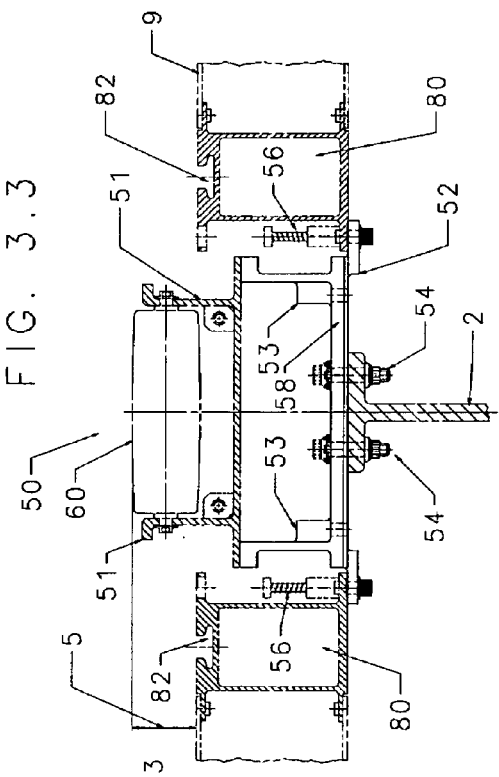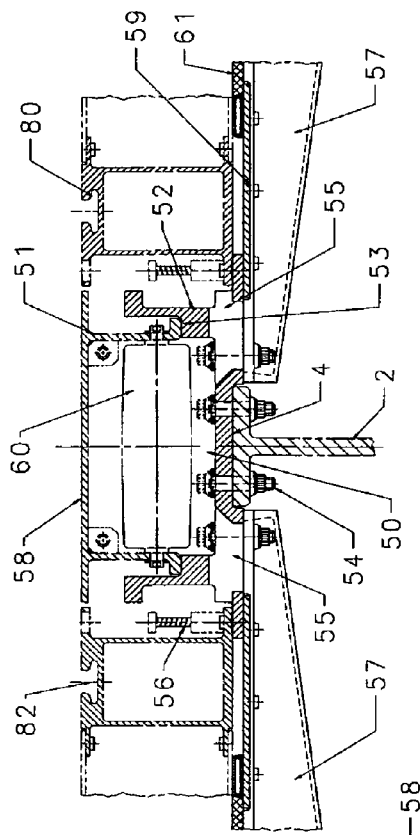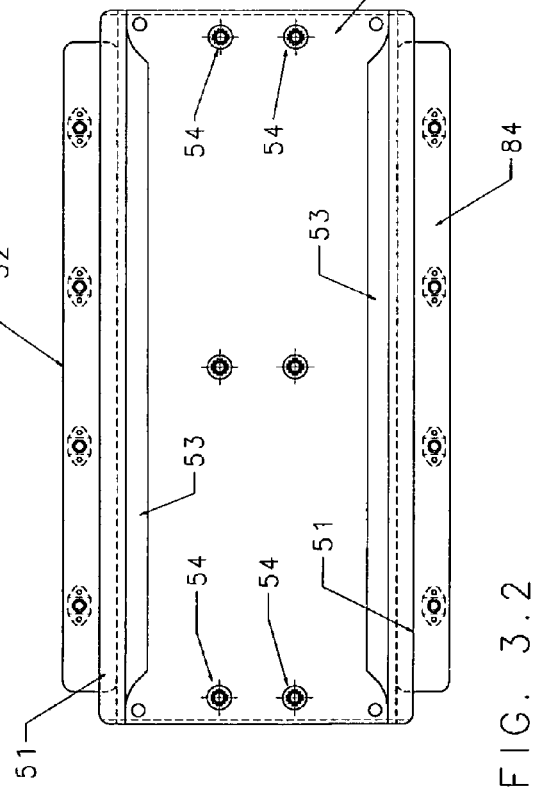

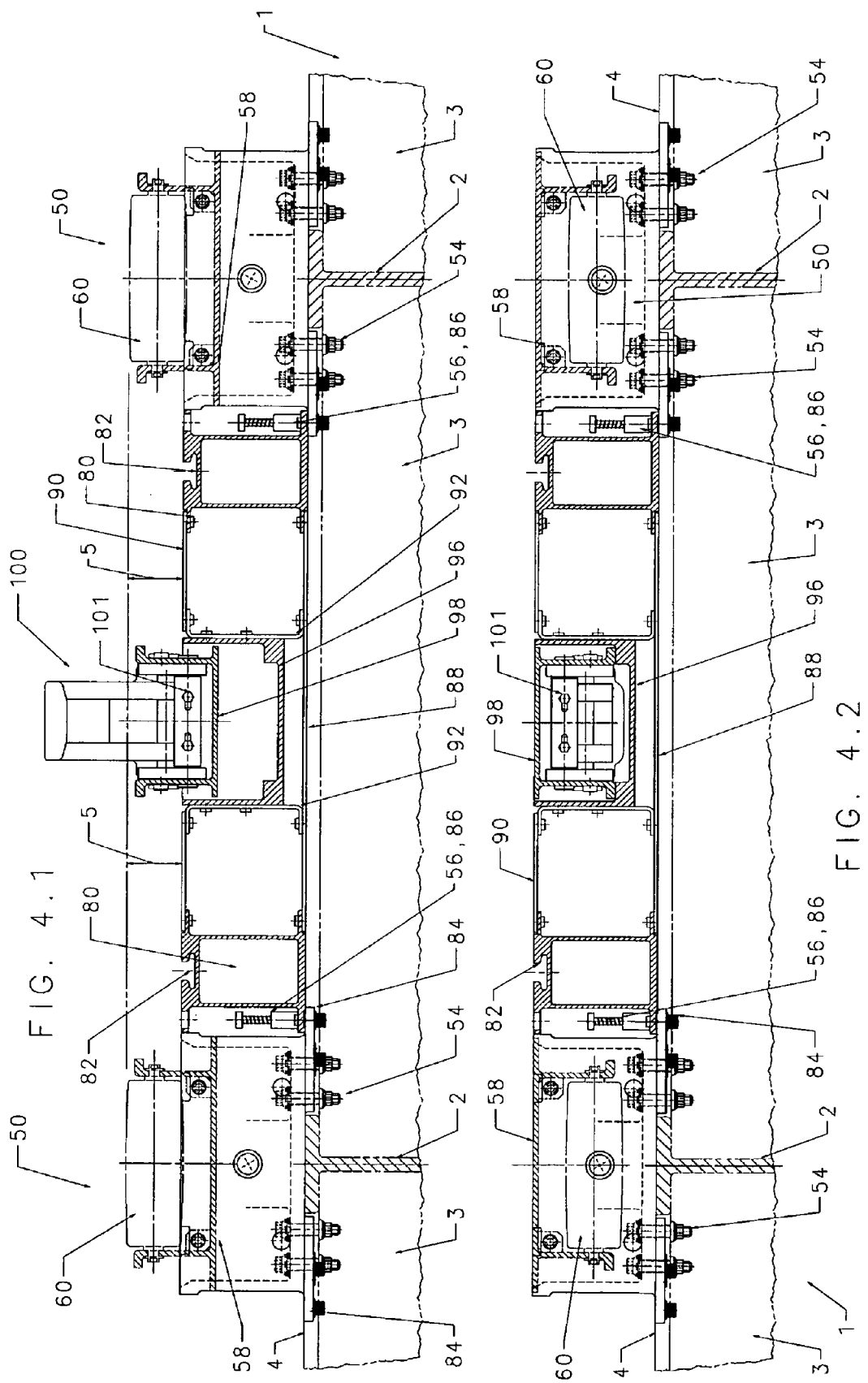

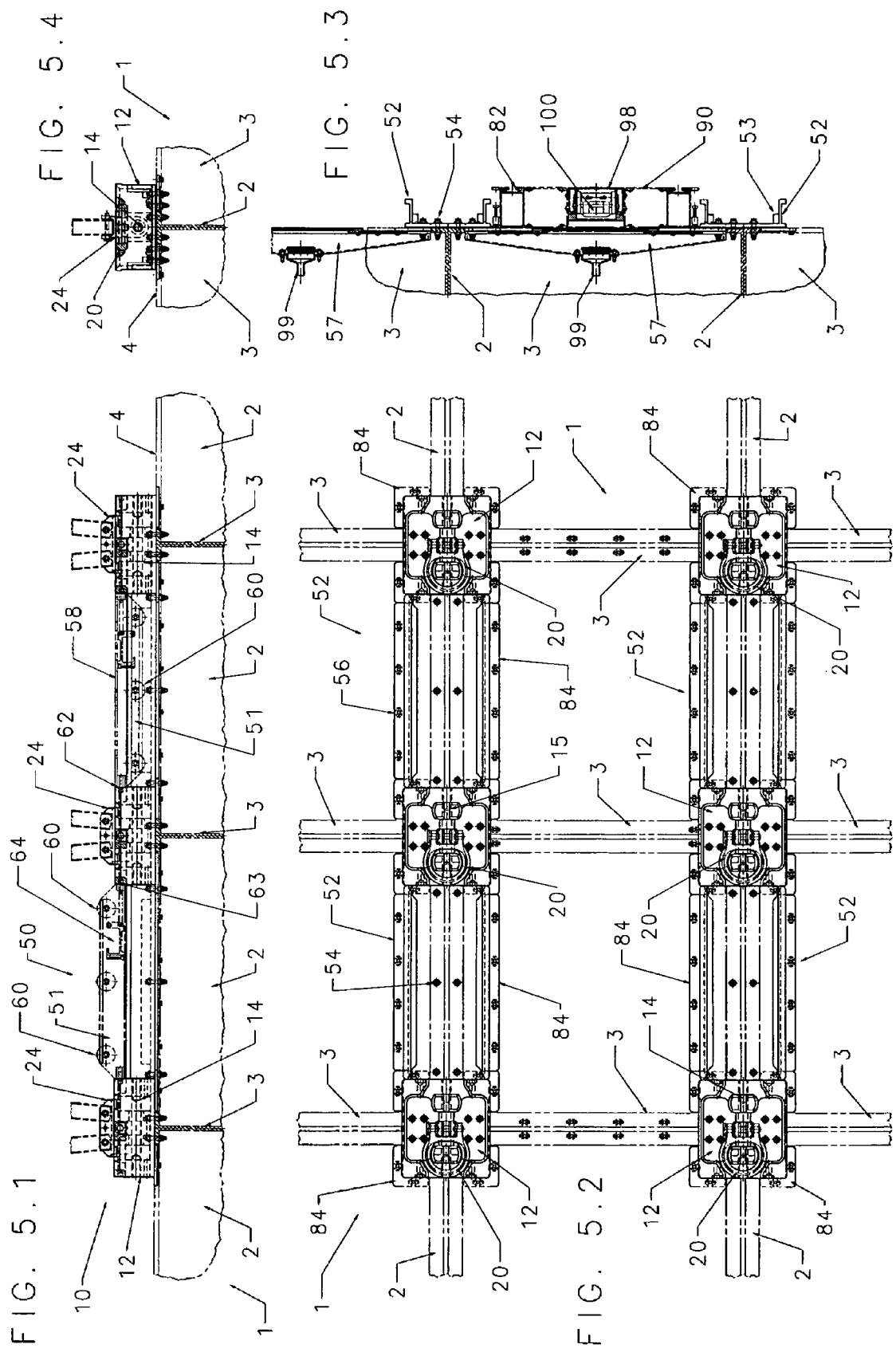

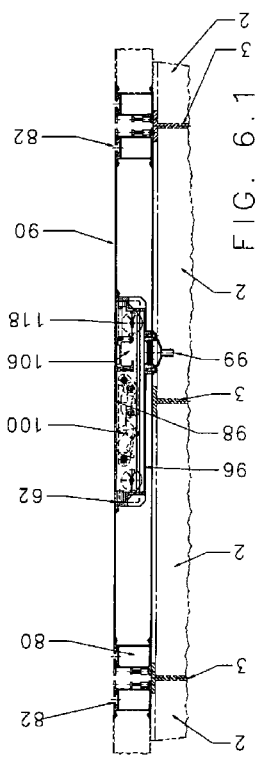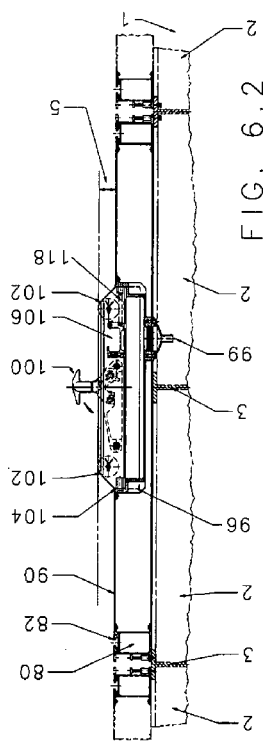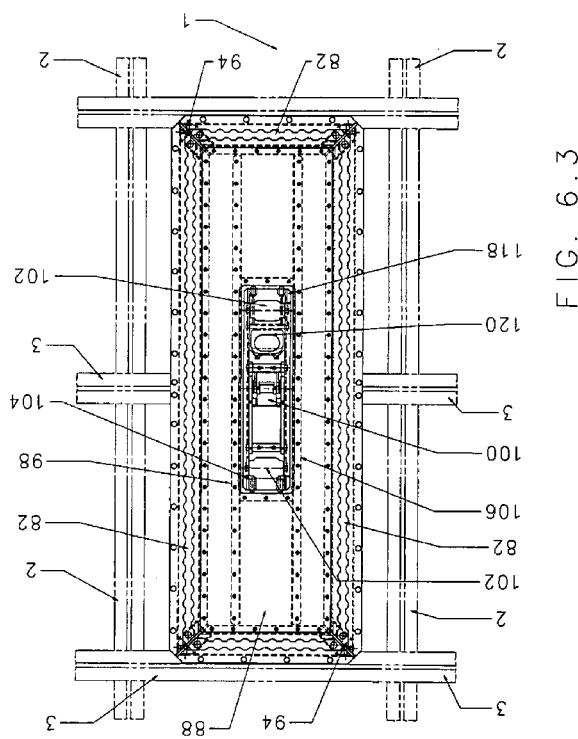

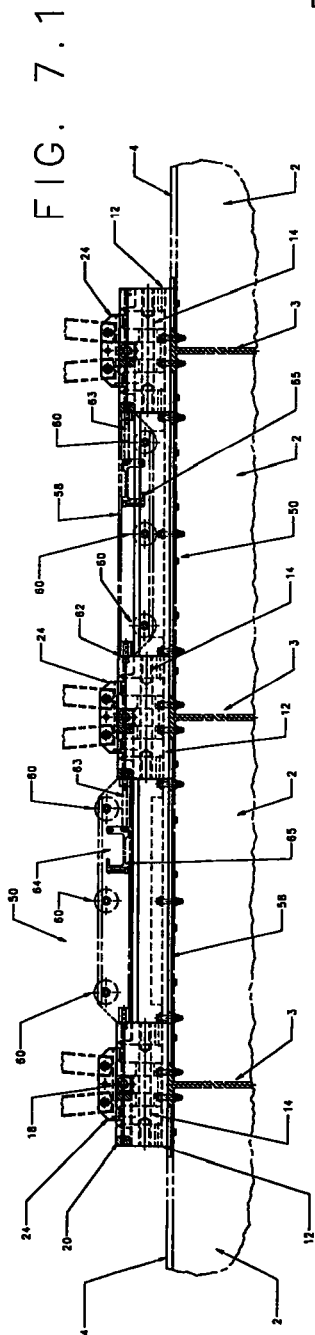

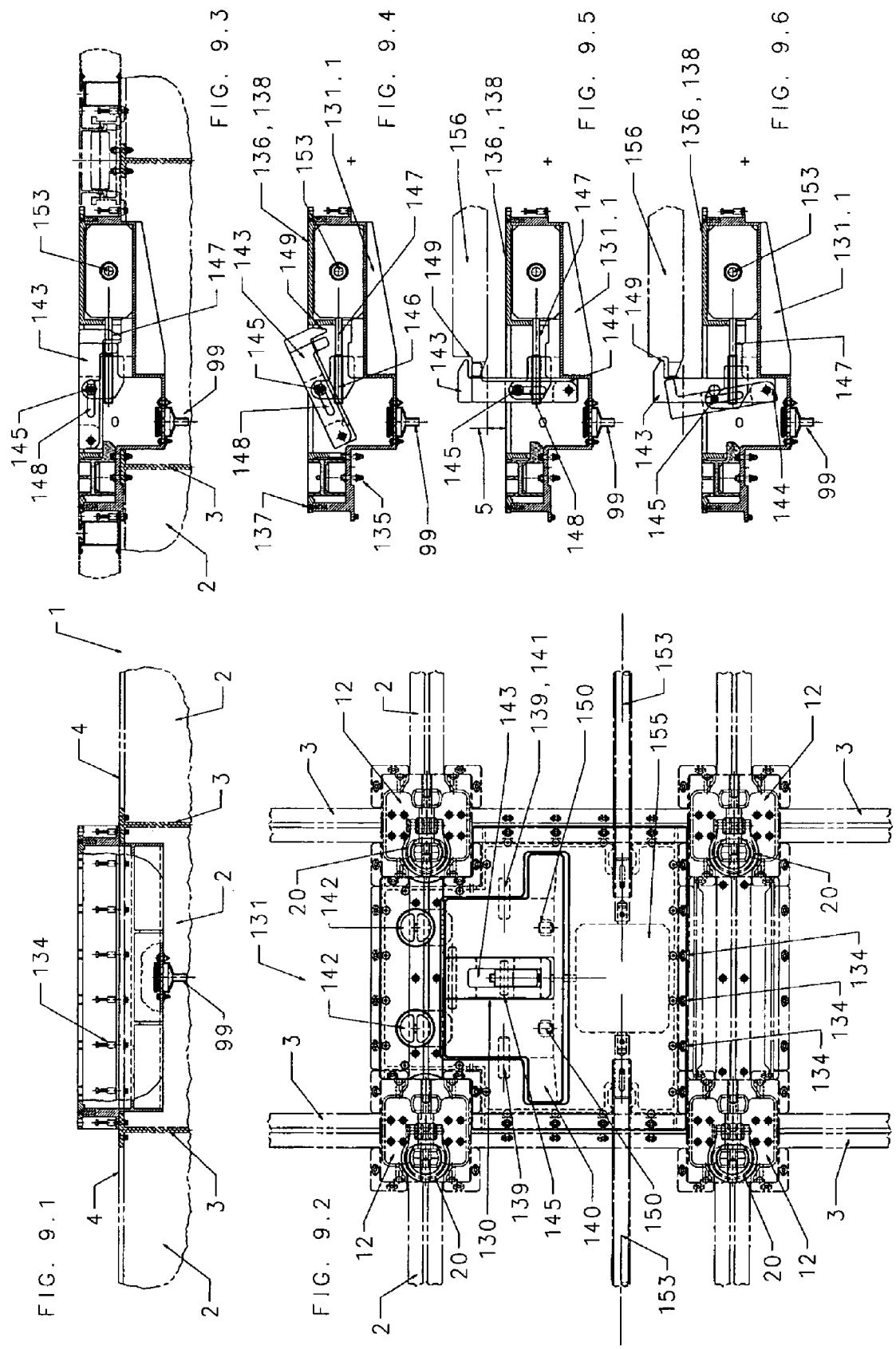

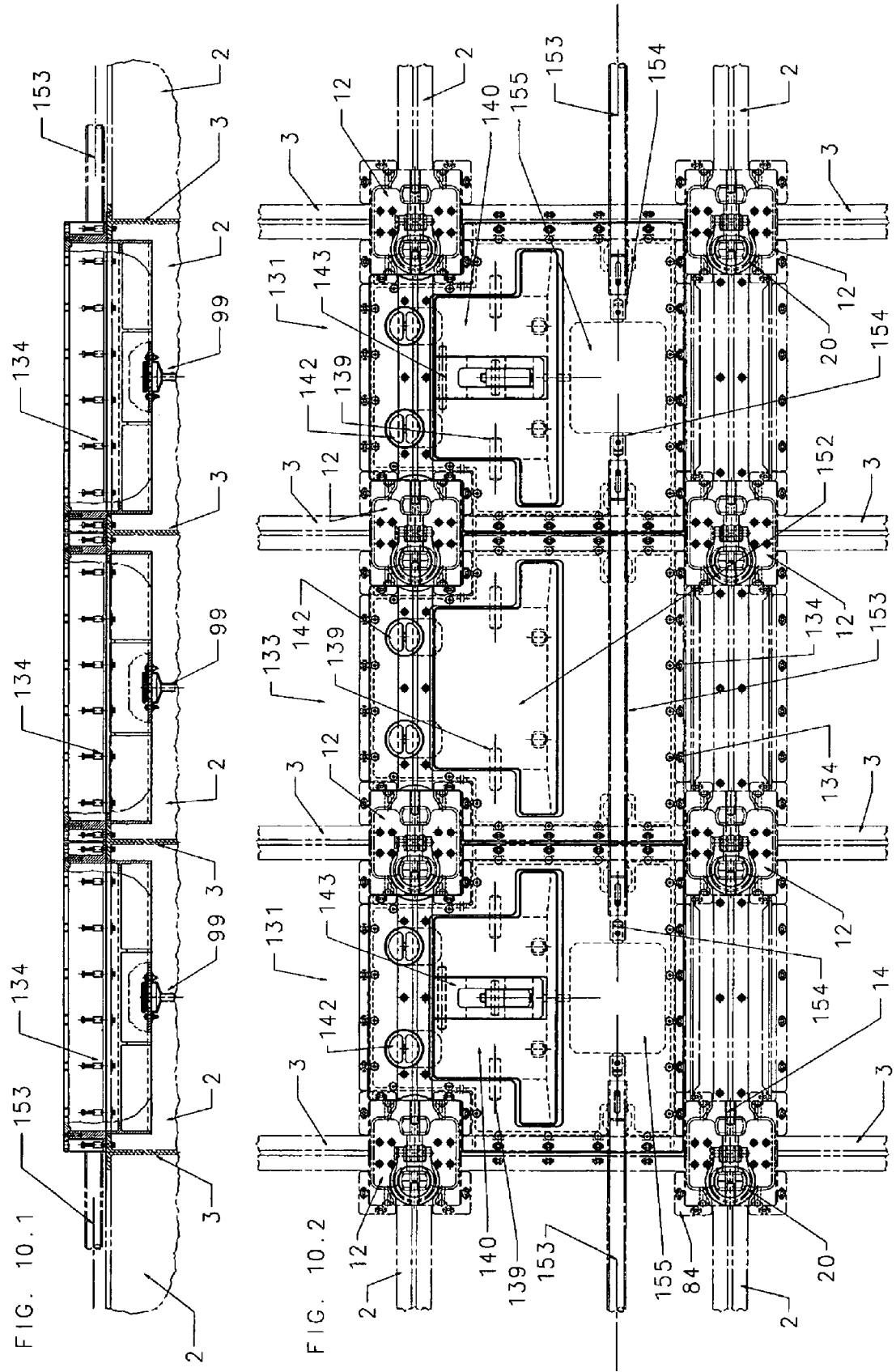

CARGO-HOLD FLOOR FOR AIRCRAFT

The invention relates to a cargo-hold floor for aircraft, which has devices for the transport and detention of articles and, in particular, can be converted simply and quickly for different applications.

A loading and unloading device for aircraft is known from DE 2 162 042. This has a control device for operating a power-drive installation, and also a restraining arrangement, the power-drive installation having a number of power-operated units to be put into operation selectively. These are arranged at various locations in the loading bay of the aircraft. The restraining arrangement has guiding and restraining means to be controlled selectively, which are likewise arranged at various locations in the loading bay of the aircraft and are controlled by switching means in a control device, so that drive units can be selectively operated which cooperate with guiding and restraining means in a coordinated way, so that a cargo article, such as, for example, a pallet or a container, can be moved in the loading bay of the aircraft and can be positioned at a defined location.

A cargo loading system for widebody aircraft became known from DE 29 08 400 A1. The cargo loading system is installed in underfloor cargo holds of widebody aircraft which are loaded with containers and pallets. The cargo loading system comprises installed roller conveyors, ball mats, carrying and braking rollers and drives assigned in each case to these. The manually operable cargo loading system can be converted for semiautomatic or fully automatic operation by the selective assignment of electrical and electronic components, and in this case, in the event of conversion, the mechanical locking components remain unchanged in structural and functional terms. The electrical components are assigned for use to the mechanical locking elements, and the mechanical locking elements are equipped in such a way that they can be foot-operated.

U.S. Pat. No. 3,262,588 discloses a cargo loading device and a restraining system which are used in the cargo loading region of an aircraft. The cargo loading system comprises a floor supporting the cargo, and also an entrance through which the cargo articles can be loaded and unloaded. A number of roller conveyors extend in the longitudinal direction in the floor of the cargo hold, each of the roller conveyors having fastening devices which are arranged so as to be spaced apart from one another in the longitudinal direction. A multiplicity of conveying rollers are received in the roller conveyors, so that an essentially continuous transport of each cargo article to a transport position can take place. Furthermore, a multiplicity of movable locking elements are received, which can be transferred from their deactivated position below a transport plane of the roller conveyers into an activated position, so that each cargo article can be secured against longitudinal movement and vertical movement on the roller conveyors. The locking elements are received in contradirectional orientation on the roller conveyors.

EP 0 964 489 A2 discloses, for the loading deck of an aircraft, a floor element which serves for the reception and displacement of cargo articles. The floor element consists essentially of a hollow profile with a continuous deck surface and with a floor surface arranged parallel to the latter. The deck surface and the floor surface are spaced apart from one another by means of a plurality of profile webs running in the longitudinal direction of the floor element. The deck surface has a number of reception orifices for reception of ball elements.

Cargo loading systems for aircraft which are used in the military sector must fulfill the requirement that the cargo-hold floor have a smooth and closed configuration, so that it is possible to walk on it and drive over it. Furthermore, the surface of the cargo-hold floor should have no stumbling places, and, moreover, the cargo hold in the floor region of an aircraft which can be used for military purposes should be convertible quickly and should also be capable of being used for civil purposes as well as military purposes.

The object on which the invention is based is to provide a cargo-hold floor for aircraft, which, on the one hand, can be used both for military and for civil purposes and, on the other hand, provides stowage space for cargo loading components not required, without the cargo-hold volume being impaired.

This object is achieved, according to the invention, by means of the features of patent claim 1.

Advantageously, the cargo-hold floor is of modular construction and is supported by a grid structure which runs through the aircraft fuselage and which has a framework-like design. The grid structure comprises essentially longitudinal members and crossmembers which have a top edge of equal height. According to the invention, the cargo-hold floor is constructed in such a way that it serves as a stowage space for all military or civil cargo loading components not required at the moment, and these cargo loading components not required at the moment are at all times also located on board in that position in the cargo-hold floor which is provided for their subsequent functioning. There is therefore no need for additional stowage space for demounted cargo loading components which impairs the cargo-hold volume. This, furthermore, dispenses with the requirement that bulky cargo loading components not used in the application relevant at the moment have to be left behind at the home base of the aircraft, in order, on the one hand, to save weight and, on the other hand, not to limit the cargo-hold volume.

The configuration, proposed according to the invention, of the cargo-hold floor affords the advantage, furthermore, that a malfunction of a cargo loading system due to wrong positioning of the cargo loading components can be ruled out.

The cargo-hold floor proposed according to the invention is constructed such that, during the transport and detention of both military and civil articles, such as, for example, pallets and containers, or else military vehicles, troops and supplies, a system height of only a few cm above the cargo-hold floor surface is achieved. The term "system height" is understood hereafter as meaning the distance between the cargo-hold floor surface and the outer surface of transport rollers introduced into a roller conveyor apparatus, to name one example. The reduced system height provided by the solution according to the invention offers, in systems both for military and for civil use, on the one hand, a reduction in weight of the entire cargo-hold floor and, on the other hand, an increase in the effective cargo-hold volume and an increase in the maximum permissible cargo or container height for military and civil purposes. The leaktightness of the cargo-hold floor against condensation water dripping off from vehicles or containers or against moisture in general is ensured in that floor plates having a seal integrated into a seat-rail box profile lie on bearing strips of lashing-point housings and bearing strips of foundation housings of roller conveyor apparatuses and also on the top edges of the grid structure of the aircraft fuselage. The bearing surfaces for the floor plates are designed to be free of offset between the top edge of the grid structure, the bearing strips of lashing points and the bearing strips of foundation housings of roller conveyor apparatuses. This gives rise to a sealing surface of the floor plates which rests uniformly and uninterruptedly. By the floor plates being designed as quickly demountable components, access to the space below the cargo-hold floor, that is to say access to supply lines laid within the grid structure, is ensured, without the leaktightness of the cargo-hold floor being impaired.

The cargo-hold floor has lashing points connected essentially fixedly to the grid structure, floor plates lying on the grid structure, and also roller conveyor apparatuses and lock carriers.

The lashing points may be provided, on the one hand, with an omnidirectionally movable lug for lighter cargo articles and, on the other hand, also with a lug for the fixing of heavier loads. The lugs can be exchanged simply by pulling a plug connection. The lashing points are provided on their surface with a tread-proof filling body, so that no stumbling places occur in the cargo-hold floor. Owing to the omnidirectional movability of both the light and the heavy lug, a flexible fastening of articles, for example via straps, is possible. To fix heavier cargo loading articles, the lashing points may have plugged into them light or even heavier additional adaptors which can likewise be moved omnidirectionally and which afford optimized fastening possibilities adapted to the corresponding cargo. In addition, roller conveyor apparatuses connectable to the grid structure may be used, which are mounted so as, in the state of use, to project above the cargo-hold floor with their rollers supporting their cargo articles. If, by contrast, these rollers are not required, they are released by means of a fastening unit, operable in a simple way, rotated and are reintroduced, reversed, into their position (stowage position), so that a smooth cargo-hold floor surface is obtained.

Furthermore, floor plates may have installed in them lock carriers which are likewise designed such that the latter, in the nonactivated state, are fitted into their foundation pit, and the underside of the lock carriers is in one plane with the surface of the floor plate.

The roller conveyor apparatuses are designed in a length which preferably corresponds to the distance between two lashing points fastened at an intersection point of the grid structure. The lock carriers integrated into the floor plates can preferably be operated with one hand, and there may also be provided in the lock carriers a fastening unit which comprises a retractable bolt, so that the lock carrier can be transferred in a simple way from its active position into its stowage position, and vice versa.

Advantageously, the floor plates lying flat on the grid structure have a, for example, peripherally formed seat-rail box profile. When the cargo-hold floor is being converted from military purposes to civil purposes, seats can be detained in this seat-rail box profile, without further fastening elements being required. When seats are introduced into the seat-rail profile, a lock carrier received centrally in the floor plate is brought from its upright operating position into its lowered transfer position and, in this stowage position, forms a planar surface with the top side of the floor plate.

To fix especially heavy loads, four lashing points received at the intersection points of longitudinal members and crossmembers of the grid structure can be covered by a connecting plate, so that, at each lashing point, a quarter of the load which the connecting plate absorbs is introduced into the grid structure. With the aid of the connecting plate which, for example, connects four lashing points to one another, especially heavy articles such as, for example, military motor trucks, can be fastened on the cargo-hold floor.

DRAWING

The invention is described in more detail below with reference to the drawing in which:

FIG. 1.1 shows a side view of a lashing point on a grid structure,

FIG. 1.2 shows a top view of the lashing point according to FIG. 1.1,

FIG. 1.3 shows the lashing point according to FIG. 1 in a side view rotated through 90°, FIG. 1.4 shows a light exchangeable fastening lug for the lashing point, FIG. 1.5 shows a heavy exchangeable fastening lug with a strap piece for the lashing point, FIG. 2.1 shows a light additional adaptor mounted in an articulated manner at the lashing point, FIG. 2.2 shows a top view of the lashing point according to FIG. 2.1, FIG. 2.3 shows a side view of the lashing point according to FIG. 2.1, FIG. 2.4 shows an illustration of the additional adaptor, FIG. 3.1 shows a roller conveyor apparatus, FIG. 3.2 shows a top view of the roller conveyor apparatus according to FIG. 3.1, FIG. 3.3 shows the erected roller conveyor apparatus fastened to the grid structure, FIG. 3.4 shows the roller conveyor apparatus countersunk into the cargo-hold floor surface and aligned with the latter, FIG. 4.1 shows erected roller conveyor apparatuses and locking units with a floor plate, FIG. 4.2 shows roller conveyor apparatuses and locking elements in alignment with the floor plate, in the stowage position, FIG. 5.1 shows a side view of a lashing point and roller conveyor apparatuses on a grid structure, FIG. 5.2 shows a top view of the grid structure according to FIG. 5.1, FIG. 5.3 shows a foundation housing, fastened to the grid structure, of a roller conveyor apparatus, FIG. 5.4 shows a view of lashing point with an additional adaptor, FIG. 6.1 shows a side view of a floor plate with a countersunk locking unit, FIG. 6.2 shows a side view of a floor plate with an erected locking unit, FIG. 6.3 shows a top view of a floor plate with a locking unit, FIG. 7.1 shows a side view of a floor plate with lashing points and with erected and countersunk roller conveyor apparatuses, FIG. 7.2 shows a top view of the floor plate according to FIG. 7.1 with the grid structure, FIG. 8 shows a connecting plate, spanning a plurality of lashing points, for fastening very heavy loads in the cargo loading bay of an aircraft, FIGS. 9.1 to 9.6 show a design variant of an electromotively operable locking system which can be used for military purposes, the electrically actuated lock being illustrated in several actuation positions, FIG. 10.1 shows a front view of several locking modules received parallel to the longitudinal members of the grid structure, and FIG. 10.2 shows a top view of electromotively operated locking units which are fastened to the top side of a grid structure and can be used for military purposes.

DESIGN VARIANTS

A lashing point which is fastened on a grid structure may be gathered from FIG. 1.1.

A grid structure 1 comprises longitudinal members 2 and crossmembers 3 and is of framework-like construction. The grid structure 1 is located within an aircraft fuselage and forms the foundation structure for a cargo loading bay floor. The top edge of the grid structure 1 is identified by the reference symbol 4. The grid structure 1 has fastened to it a lashing point 10 which serves as a central force transmission unit. The lashing point 10 comprises a lashing point housing 12 which receives a horizontally running lashing point shaft 14 mounted on both sides. A receptacle 16 is mounted on the lashing point shaft 14. The shaft bearings for the lashing point shaft 14 in the lashing point housing 12 are indicated by the reference symbol 15. The receptacle 16 comprises a double lug shackle in which, in the illustration according to FIG. 1.1, a light lug 20 is received. By means of a plug connector 18, the light lug 20 for low load is connected to the double lug shackle of the receptacle 16. The double lug shackle of the receptacle 16 is surrounded by the lug 20 for low load. The plug connector 18 is arranged so as to be offset at 90° with respect to the lashing point shaft 14, thus making an omnidirectional loading of the lashing point 10 possible, without this leading, in the case of the light lug 20 or in the case of optionally usable heavy lugs 22 for heavier loads, to unfavorable bending loads on these components. Since the lugs 20 and 22 can be oriented optimally, the lugs 20 and 22 subjected to tensile load and the lashing point housing 12 of the lashing point 10 can have a weight-optimized design.

The lashing point housing 12 has bearing strips with integrated, but releasable fastening elements 30, on which floor plates 80 or foundation housings 52 of roller conveyor apparatuses 50 can be received.

The arrangement of the horizontally running lashing point shaft 14 in the direction of flight and of the plug connector 18 arranged above the latter and so as to be offset at 90° with respect to it allows a maximum movability of the light lug 20 for low load of 180°. The end positions of the lug 20 are formed by two depository slots in the lashing point housing 12, in such a way that the light lug 20 for low load is deposited, either in the direction of flight or opposite to the direction of flight, with its top edge flush with the top edge of the lashing point housing, without the plug connector 18 in this case being released. Accidents caused by lugs which can be deflected only to one side and possess a stop on the other side can thereby be avoided. These project from the cargo-hold floor and do not fall back into their depository as a result of gravity. Driving over the lugs projecting from the cargo-hold floor would necessarily cause them to become unusable.

It may be gathered from the illustration according to FIG. 1.1 that, instead of the light lug 20, a double lug shackle of the receptacle 16 may optionally be connected to a heavy lug 22, on which a strap piece 23 is indicated.

FIG. 1.2 shows a top view of the lashing point according to FIG. 1.1.

The light lug 20 lies within the lashing point housing 12 of the lashing point 10. The light lug 20 is connected movably with its lug eyes 21 to the double lug shackle of the receptacle 16 rotatable about the lashing point shaft 14. The plug connector 18 passes through both the lug eyes 21 and the double lug shackle of the receptacle 16. The illustration according to FIG. 1.2 reveals the bearing strips 84, surrounding the lashing point housing 12 and to which floor plates 80, not illustrated, are fastened via fastening elements 30 in FIG. 1.2. The bearing strips 84 of the lashing point housing 12 are in alignment with the top edges 4 of the longitudinal members 2 and of the crossmembers 3 of the grid structure 1. A tread-proof filling body 32 is introduced into the lashing point housing 12. The tread-proof filling body 32 fills the interior of the lashing point housing 12 in a planar manner, thus giving rise, when floor plates 80 are installed, to a smooth surface free of stumbling places. The tread-proof filling body 32 is manufactured from an elastic material and has a recess in which the light lug 20 lies. The elastic material and the form of the tread-proof filling body 32 are such that it carries a body weight, including personal baggage, yields elastically when vehicles roll over it, and cannot be damaged.

FIG. 1.3 shows the lashing point according to FIG. 1.1 in a side view rotated through 90°.

The lashing point housing 12 is fastened to the grid structure 1 via fastening elements 28. As may be gathered from the illustration according to FIG. 1.3, the light lug 20 is pivotable about the fastening element 18 and over the angular range α. The reference symbol 20 represented by dashes designates the horizontal position of the light lug 20 introduced into the lashing point housing 12. On the one hand, the light lug 20 is received movably about the plug connector 18 (cf. FIG. 1.1), on the other hand the receptacle 16 is movable about the lashing point shaft 14, so that the light lug 20 can move in all directions.

A top view of the light lug 20 for the lashing point may be gathered from the illustration according to FIG. 1.4.

The light lug 20 comprises, on its side pointing toward the double lug shackle of the receptacle 16, lug eyes 21 through which the plug connector 18 passes.

A heavy lug for the lashing point may be gathered from the illustration according to FIG. 1.5.

In contrast to the illustration according to FIG. 1.4, the heavy lug 22 illustrated in FIG. 1.5 has three lug eyes 21, so that, when the plug connector 18 is plugged through the lug eyes 21, several shear cross sections are obtained, and the plug connector 18 and heavy lug 22 are suitable for heavier loads. A receptacle 23 is illustrated on the heavy lug 22.

The light lug 20 for low load constitutes the standard fitting for the lashing point 10, thus minimizing the overall weight of a cargo-hold floor and at the same time increasing flexibility. All the lashing points 10 on a cargo-hold floor can be converted quickly to the optionally usable heavy lug 22 for high loads. The heavy lugs 22 therefore have to be carried only in limited numbers, depending the respective application. The loadability of the lashing point 10 due to the following pivotable individual parts: receptacle 16, plug connector 18, light lug 20 and heavy lug 22 with receptacle 23, allows a free pivoting range within the lashing point housing 12 which is closed, up to the top edge of the cargo-hold floor, by the tread-proof filling body 32, illustrated in FIG. 1.2, which consists of elastic material. Stumbling edges are thereby avoided, although the weight of a person, including equipment, can be absorbed. The filling bodies 32 are elastic, in order, in the pivoting range of the lashing point housing 12, to yield to the movements of the receptacle 16 of the plug connector 18 and of the lugs 20, 22. The material from which the filling bodies 32 are manufactured has sufficient elasticity in order to absorb the load caused by vehicles rolling over the lashing points 10, without being damaged. Covers of the lashing point housings 12 would be destroyed on account of the high axle loads of vehicles. The filling bodies 32 can remain constantly within the lashing point housing 12, and any other previous rigid cover would have to be removed in order to allow the lashing point 10 to be used.

FIG. 2.1 shows the light additional adaptor plugged in the lashing point.

If the lashing point 10 is equipped with the light lug 20 for low load, a light optional additional adaptor 24 may be used. By the plug connector 18 of bolt-shaped design being pulled, the central double lug shackle, not used in this case, of the receptacle 16 can be released, and the additional adaptor 24 can be inserted and detained on the receptacle 16 by the plug connector 18 of bolt-shaped design being pushed in. The light optional additional adaptor 24 is in this case seated positively on the lashing point housing 12 which fixes the receptacle 16 on the lashing point shaft 14 against rotation. The light lug 20 for low load is in this case located in one of the two essentially horizontally running pockets of the lashing point housing 12 below the top edge of the cargo-hold floor. The light lug 20 for low load can remain in the lashing point housing 12 of the lashing point 10 when the light additional adaptor 24 is used, as can the tread-proof filling bodies 32 when the light optional additional adaptor 24 is used. Advantageously, there is no need for any additional fastening elements and securing elements, thus simplifying the handling and the easy accessibility of the reception bore when the light optional additional adaptor 24 is used. The light optional additional adaptors 24 still lie (cf. the illustration according to FIG. 5.1) with their top edge below the system height 5 and therefore do not impede the transport of military or civil pallets or containers.

If, according to the illustration in FIG. 8, a connecting plate 40 spanning a plurality of lashing points is used for fixing very heavy loads, heavy additional adaptors 26 are employed. These have a triple lug shackle and are inserted into the receptacle 16 by means of the plug connector 18 of bolt-shaped design. Four heavy optionally usable additional adaptors 26 can be connected to a central load absorption unit via a connecting plate 40, so that loads arising from military requirements can be introduced into the grid structure 1 of the aircraft fuselage via four lashing points 10. This, on the one hand, increases flight safety and, on the other hand, prevents overloading of and damage to the carrying aircraft structure.

FIG. 2.2 shows a top view of the lashing point according to the illustration in FIG. 2.1. The grid structure 1, comprising intersecting longitudinal members and crossmembers 2, 3, receives the lashing point housing 12. The lashing point shaft 14 is mounted on both sides in the lashing point housing 12 and receives the receptacle 16. In the illustration according to FIG. 2.1, the light additional adaptor 24 is received on the receptacle 16 by means of the plug connector 18. On the other hand, the light lug 20 for low load is mounted omnidirectionally on the receptacle 16. A plurality of orifices for reception of bolts 25 are received on the light additional adaptor 24 (cf. the illustration according to FIG. 2.4). The lashing point housing 12 has located on it angularly designed bearing strips 84 which serve as sealing surfaces and the top side of which runs in one plane with the top side of the longitudinal members 2 or of the crossmembers 3 of the grid structure 1.

FIG. 2.3 shows a side view of the lashing point according to the illustration in FIG. 2.1.

It may be gathered from the illustration according to FIG. 2.3 that the lashing point housing 12 is connected to the grid structure 1 via the fastening elements 28. The lashing point shaft 14, doubly mounted rotatably in the lashing point housing 12, receives the receptacle 16, the lug shackles of which receive, in addition to the lug 20 for low load (cf. the illustration according to FIG. 2.2), the light additional adaptor 24. The latter has on its underside only one lug eye 21 through which the plug connector 18 passes. On the side webs of the light additional adaptor 24, a plurality of bores are formed, which serve for receiving bolt-shaped connecting elements 25, to which seats, hospital beds or other articles of equipment can be fastened.

FIG. 2.4 shows an illustration of the same additional adaptor in three side views.

The light additional adaptor according to the illustrations in FIG. 2.4 has a lug eye 21 which is formed centrally on its underside and which is received in the double lug shackle on the receptacle 16 of the lashing point 10. The bores lying opposite one another for the reception of fastening elements 25 of bolt-shaped design can be seen on the side webs of the light additional adaptor 24.

FIG. 3.1 shows a roller conveyor apparatus.

A roller conveyor apparatus 50 is permanently connected to the grid structure 1, not illustrated in FIG. 3.1, via a foundation housing 52 by means of fastening elements 54. The foundation housing 52 comprises bearing strips with integrated, but releasable fastening elements 56 for floor plates 80 (cf. the illustration according to FIG. 3.3). The foundation housing 52 serves for receiving the roller conveyor apparatus 50 in the lowered and therefore drive-over state and in the erected and therefore operationally ready state. In each state, a respective uninterrupted bearing of the roller conveyor apparatus 50 on the foundation housing 52 is ensured, said bearing being arranged in the longitudinal direction of the roller conveyor apparatus 50. This leads, when the roller conveyor apparatus 50 is subjected to load, to a uniform introduction of force into the grid structure 1 of the aircraft fuselage and avoids the occurrence of bending loads in the longitudinal direction of the roller conveyor apparatus 50, thus leading to a minimization of the weight of the cargo-hold floor. The foundation housing 52 serves as a collecting basin for drainage fluids from the adjacently arranged lashing points 10 and from the likewise adjacently received floor plates 80. The roller conveyor apparatus 50 is provided with transport rollers 60 having bearing shafts and cotter pins 112, with fixed fastening bolts 62, with guides and movable sliding bolts 63 and with a release grip 65. The transport rollers with bearings 60 and cotter pins 112 and also the sliding bolts 63 and the release grip 65, as components, are received within a fastening unit 64 of the roller conveyor apparatus 52. The distance between the transport rollers 60 on the entire cargo-hold floor is, in the transport direction, a maximum of 254 mm (10 inches) and is reduced to a fraction of this within the roller conveyor apparatus 50. This improves the carrying capacity of the roller conveyor apparatus 50 and counteracts a failure of individual transport rollers 60 due to overload. The fixed fastening bolts 62 and the fastening unit 64 with shaft cotter pins 112, with spring-loaded sliding bolts 63 and with the release grip 65 detain the roller conveyor apparatus 50 at the ends in the longitudinal direction in four corresponding reception bores of lashing point housings 12, not illustrated in FIG. 3.1. This takes place such that, in the lowered and therefore drive-over state, a closed underside 58 of the roller conveyor apparatus 50 (cf. the illustration according to FIG. 3.4) points upward and is level with the top side of the cargo-hold floor. The underside 58 of the roller conveyor apparatus 50 consequently forms an uninterruptedly planar walk-on or drive-over surface aligned with the cargo-hold floor. In the lowered state of the roller conveyor apparatus 50, the fastening unit 64 can be released through an operating orifice in its underside 58 with only one hand, via the release grip 65 prestressed by two springs, from the lashing point housing 12 in which the sliding bolts 63 are located and are retracted out of the reception bores of the lashing point housing 12 when the release grip 64 is actuated. After the roller conveyor apparatus 50 has been slightly raised laterally, the latter, together with the fixed fastening bolts 62, can be pulled on an opposite second lashing point housing 12, without the assistance of a second hand of the operator. The one-handed operability ensures the quickest possible conversion times for the cargo-hold floor.

FIG. 3.3 shows the erected roller conveyor apparatus fastened to the grid structure.

It may be gathered from the illustration according to FIG. 3.3 that the outer surfaces of the transport rollers 60 project at a system height 5 above the surface of sealing sheets 90 of the floor plates 80. The transport rollers 60 are received in an upper part 51 of the roller conveyor apparatus 50 via bolts. Located in the foundation housing 52 are bearing surfaces 53, on which the angled ends of the webs of the upper part 51 rest in the countersunk state according to FIG. 3.4, so that the roller conveyor apparatus floor 58 forms with the sealing sheets 90 of the floor plates 80 a planar cargo-hold floor. It may be gathered, moreover, from the illustration according to FIG. 3.3 that the floor plates 80 have in each case seat-rail profiles 82. The roller conveyor apparatus 50 is screwed to side webs of the floor plates 80 via fastening elements 56. The foundation housing 52 of the roller conveyor apparatus 50 itself is screwed to the grid structure 1, in this case to its longitudinal member 2, via fastening elements 54.

A top view of the roller conveyor apparatus may be gathered from the illustration according to FIG. 3.2. The roller conveyor apparatus floor 58 has, laterally, bearing strips 84 which function as sealing surfaces. The roller conveyor apparatus floor 58 receives a plurality of fastening elements 54, by means of which the foundation housing 52 of the roller conveyor apparatus 50 can be screwed to the grid structure 1 of the aircraft fuselage. According to the illustration in FIG. 3.2, in the roller conveyor apparatus floor 58, bearing surfaces 53 are formed which run parallel to the bearing strips 84 and which serve for receiving the countersinkable upper part 51 of the roller conveyor apparatus 50.

The roller conveyor apparatus countersunk into the cargo-hold floor surface and aligned with the latter may be gathered from the illustration according to FIG. 3.4.

It may be gathered from the illustration according to FIG. 3.4 that the roller conveyor apparatus floor 58 forms with the floor plates 80 running on both sides of the latter a planar smooth cargo-hold floor surface. The upper part 51 of the roller conveyor apparatus 50 in this case lies with its angled ends on the bearing surfaces 53 of the foundation housing 52. The bearing strips 84, which function as sealing surfaces, are connected, on the one hand, to the foundation housing 52 and are screwed to the side webs of the floor plates 80 via fastening elements 56. The foundation housing 52 of the roller conveyor apparatus 50 is itself screwed to the longitudinal member 2 of the grid structure 1 via fastening elements 54.

As may be gathered from the figure sequence of FIGS. 3.1, FIG. 3.3 and FIG. 3.4, an unlocked roller conveyor apparatus 50 can be extracted from its receptacle between two lashing point housings 12 and can be inserted, reversed, with the closed underside 58 downward and just under the cargo-hold floor top edge, into the reception bore of one of the two lashing point housings 12 by means of the fixed fastening bolts 62. The upper part 51 of the roller conveyor apparatus 50 is thereafter set down on the foundation housing 52, the sliding bolts 63 being pushed into the reception bore of the other lashing point housing 12. A system height 5 is consequently implemented between the top side of the cargo-hold floor and the top side of the transport rollers 60, the fixed fastening bolts 62 and the movable sliding bolts 63 of the fastening unit 64 serving, as in the lowered state of the roller conveyor apparatus 50, too, only for detaining the roller conveyor apparatus 50 and not for force transmission.

The fastening unit 64 can be released both from the top side and from the underside of the roller conveyor apparatus 50 via the release grip 65, the release grip 65 rotating about a shaft secured in the roller conveyor apparatus 52 by means of two cotter pins. In this case, the two movable sliding bolts 63 are necessarily retracted simultaneously by means of their guides. When the roller conveyor apparatus 50 is latched into a lashing point housing 12, the movable sliding bolts 63 are automatically pushed back, counter to the spring forces, over the run-on slope of said lashing point housing and, when they reach the reception bore of the lashing point housing 12, snap automatically and positively into the lashing point housing 12 simultaneously. The fastening unit 64 is not actuated during this operation.

The advantages of the roller conveyor apparatus 50 proposed according to the invention, together with the fastening unit 64, are that the roller conveyor apparatus 50 can be operated with one hand on both sides from the top side or underside of the roller conveyor apparatus 50. This not only makes it easier to operate the latter, but also allows a positive simultaneous locking of the two movable sliding bolts 63, thus increasing the degree of safety. It can be detected from an upright release grip 65 whether one of the sliding bolts 63 and therefore, necessarily, also the other of the sliding bolts 63 are not snapped into the reception bore of the lashing point housing 12, and consequently the roller conveyor apparatus 50 is not detained reliably.

The foundation housing 52 of the roller conveyor apparatus 50 comprises drainage orifices 55. These lie, with respect to the top edge 4 of the grid structure 1, that is to say with respect to the top edge 4 of the longitudinal member 2, in such a way that the drainage fluid is discharged even from the top edge 4 of the longitudinal members 2 or of the crossmembers 3 of the grid structure 1. This ensures that all the fluid entering through the joints between the roller conveyor apparatus floor surface 58 and the floor plates 80 is discharged into collecting troughs 57. The collecting troughs 57 are preferably configured such that fluids in each case trickling or flowing into the collecting troughs 57 via the drainage orifices 55 are led to the drainage funnel 99 having a filter insert in the collecting troughs, from which they are delivered to a drainage system on a fluid discharge system. Below the fastening elements 56 for the floor plate 80 are located sealing sheets 59 and, offset laterally with respect to these, sealing strips 61, by means of which the floor plates 80 are sealed off on the underside.

Erected roller conveyor apparatuses and locking units, together with floor plates, which are arranged on the grid structure of an aircraft fuselage, may be gathered from the illustration according to FIG. 4.1.

A floor plate 80 comprises a peripheral frame consisting of seat-rail box profiles 82 which on their top side have a seat-rail box profile 82. The frame structure of the floor plates 80 is connected easily releasably, via installation screws 86 mounted fixedly on its seat-rail box profiles 82, to the grid structure 1 of the aircraft fuselage, to the bearing strips 84 for the lashing point housings 12 and their fastening elements and to the bearing strips 84 of the foundation housings 52 of the roller conveyor apparatuses 50 and their fastening elements. The seal which lies uniformly on the bearing surfaces of the grid structure 1 of the aircraft fuselage, that is to say the longitudinal member 2 and the crossmember 3, the bearing strips 84 of the lashing point housings 12 and the bearing strips 84 of the foundation housings 52, and which runs peripherally around the floor plate 80 and is integrated into the seat-rail box profiles 82 of the floor plate 80 closes the cargo-hold floor. The sealing surface, without losing sealability due to the multiple releasing and mounting of the floor plate 80, prevents drainage fluid and solids from trickling through the cargo-hold floor into the underfloor region of the aircraft fuselage. Demounting and mounting the floor plate 80 easily and without difficulty via the installation screws 86 makes underfloor work easier and speeds this up on account of the optimum accessibility of the underfloor region. Since the floor plates 80 can simply be extracted, relatively large orifices in the cargo-hold floor are obtained when one or more floor plates 80 are demounted.

The seat-rail box profiles 82 are connected positively to one another via corner fittings 94 (cf. FIG. 6.3). In addition, in each case only one complete floor sheet 88 connected fixedly to the seat-rail box profiles 82 and one deck sheet 90 are used, which, in turn, are connected to one another by means of supporting profiles 92. A foundation pit 96 is connected fixed to the deck sheet 90 and to the supporting profile 92, thus producing a subassembly which has extremely high bending resistance and connection stability and which is capable of withstanding the high loads required which are caused by vehicles in the case of military applications. The fixed integration of the foundation pit 96 into the floor plate 80 makes it possible to introduce holding and guiding forces, arising from the military and civil requirements, via the various inserts into the foundation pit 96 and through the latter into the grid structure 1. The position, size and configuration of the foundation pit 96 can be adapted to the given requirements within the scope of the structurally identical seat-rail box profiles 82, which signifies high flexibility, at the same time with a standardization of the floor plates 80.

As may be gathered from FIGS. 4.1 and 4.2, an arrangement possibility and design of the foundation pit 96 serve for the reception of a lock carrier 98. As illustrated in FIG. 4.2, the lock carrier 98 can be introduced into the foundation pit 96 in such a way that it is possible to drive over said lock carrier in the lowered state. In the state illustrated in FIG. 4.1, the lock carrier 98 is operationally ready. In the lowered and therefore drive-over state according to the illustration in FIG. 4.2, a bearing surface, running in the longitudinal direction of the foundation pit 96, of the lock carrier 98 is supported by bearing strips of the foundation pit 96, thus allowing, when the lock carrier 98 is driven over, a uniform introduction of force into the grid structure 1 of the aircraft fuselage and avoiding the occurrence of bending loads in the longitudinal direction of the lock carrier 98. The lock carrier 98 comprises a folding lock 100 which is pivotable about a lock axis 101, and in each case a transport roller located in front of it and behind it, and the fastening devices for the foundation pit.

As may be gathered, furthermore, from FIG. 4.1, roller conveyor apparatuses 50 are illustrated in each case adjacently to the floor plate 80, the transport rollers 60 of said roller conveyor apparatuses projecting above the cargo-hold floor, that is to say above the deck sheets 90, by the amount of the system height 5. The roller conveyor apparatuses 50 are connected via fastening elements 54 to the grid structure 1, that is to say to the longitudinal member 2 or to the crossmember 3 of the grid structure 1. The bearing strips 84, which are formed on the foundation housings 52 of the roller conveyor apparatuses 50, are connected to the seat-rail box profiles 82 of the floor plate 80 via the installation screws 86.

An as far possible planar cargo-hold floor surface may be gathered from the illustration according to FIG. 4.2, since both the two roller conveyor apparatuses 50 and the lock carrier 98 are received in reversed position, that is to say in their stowage position, either in the foundation pit 96 or in the foundation housing 52. The roller conveyor apparatus floor 58, the deck sheets 90 of the floor plates 80 and the bottom surface of the lock carrier 98 form a planar smooth cargo-hold floor surface over which vehicles can readily drive for military purposes. The transport rollers 60 and the folding lock 100 are in each case lowered into the cargo-hold floor in their inactive position and, as required, can immediately be made ready for use again simply by being changed over with one hand from their lowered position into their active positions illustrated in FIG. 4.1.

A side view of lashing points and of roller conveyor apparatuses which are received on a grid structure may be gathered from the illustration according to FIG. 5.1.

It becomes apparent from the illustration according to FIG. 5.1 that roller conveyor apparatuses 50 are interposed between individual lashing point housings 12 which in each case have a lashing point shaft 14, the receptacle received on the latter and a light additional adaptor 24. One of the roller conveyor apparatuses 50 illustrated in FIG. 5.1 is introduced, lowered, with its roller conveyor apparatus floor 58 into the cargo-hold floor surface, while the other of the roller conveyor apparatuses 50 is illustrated in its position of use. In this case, the transport rollers 60 project above the cargo-hold floor surface by the amount of the system height 5. The active operationally ready roller conveyor apparatus 50 is detained via the sliding bolts 63 of the fastening unit 64 in corresponding reception orifices of the middle lashing point housing 12, while the fixed fastening bolts 62 project into the lashing point housing 12 illustrated at outside left. Each of the lashing point housings 12 comprises a light lug 20 for low loads.

FIG. 5.2 shows a top view of the grid structure according to the illustration in FIG. 5.1.

It becomes apparent from the illustration according to FIG. 5.2 that roller conveyor apparatuses 50 are integrated between the individual lashing point housings 12 on the longitudinal members 2 of the grid structure 1 which are connected to the crossmembers 3. Of the roller conveyor apparatuses 50, only the two foundation housings 52 are illustrated in FIG. 5.2. Their bearing strips 84 are in alignment with bearing strips 84 which surround the lashing point housings 12. The top edge 4, the crossmember 3, the bearing strips 84 of the foundation housings 52 and the bearing strips 84 of the lashing point housings 12 form the bearing surfaces onto which floor plates 80, not illustrated in FIG. 5.2, are laid. A light lug 20 for low load is in each case introduced omnidirectionally movably in the lashing point housings 12. The foundation housings 52 are connected to the longitudinal members 2 via fastening elements 54. The bearing strips 84, which together with the floor plates 80 form the sealing surfaces, have screwed into them installation screws 86 and 30, not illustrated in FIG. 5.2, by means of which the floor plates 80 are fastened between the lashing point housings 12 or the foundation housings 52. The construction of the lashing point housings 12 has already been described in connection with FIGS. 1.1 to 2.2.

FIG. 5.3 shows a foundation housing of a roller conveyor apparatus, said foundation housing being fastened to the grid structure.

Of the roller conveyor apparatus 50, only the foundation housing 52, together with its bearing surfaces 53 for receiving the upper part 51 of the roller conveyor apparatus 50, is illustrated in the illustration according to FIG. 5.3. Located laterally on the foundation housing 52 are the bearing surfaces 84 which, together with the seat-rail box profiles 82 surrounding the floor plates 80, form a sealing surface. The drainage funnels 99, which have a filter insert, are located in the middle on the collecting troughs 57, illustrated in FIG. 5.3, for the reception of drainage fluid. The filter insert is mounted in the filter holder. The cleaning of the collecting trough 57 or the exchange of the filter insert received in the drainage funnel 99 takes place in a simple way by the rapid removal of the floor plate 80, after which the collecting trough 57 is exposed and easily accessible from the top side. According to the illustration in FIG. 5.3, a folding lock 100, which is received in the lock carrier 98, is located above the collecting trough 57. These components are illustrated, integrated into a deck sheet 90 of a floor plate 80. After the extraction of the floor plate 80 as a result of the release of the fastenings 56, the floor plate 80 can be extracted in a simple way, so that the collecting trough 57 is easily accessible.

A view of a lashing point with an additional adaptor may be gathered from the illustration according to FIG. 5.4.

FIG. 5.4 reproduces a lashing point housing 12 according to the illustration in FIG. 5.1. The lashing point housing 12 comprises a lashing point shaft 14, on which a light lug 20 for low load is received omnidirectionally, with a receptacle 16 (not illustrated in any more detail) being interposed. The light lug 20 is in alignment within the lashing point housing 12, an additional adaptor 24 being received on the receptacle in the illustration according to FIG. 5.4.

FIG. 6.1 shows a side view of a floor plate with a counter-sunk lock carrier.

The floor plate 80 lies indirectly, via the foundation housing 52 of the roller conveyor apparatuses 50 and the lashing point housings 12, on the longitudinal members 2 and directly on crossmembers 3 of the grid structure 1 in an aircraft fuselage. The foundation pit 96 receives the lock carrier 98 in the stowed position, so that the rear side of the latter forms with the deck sheets 90 of the floor plate 80 a planar smooth and as far as possible uninterrupted surface. The lock carrier 98 likewise has a fastening unit 106 which contains both fixed fastening bolts 104 and movable fastening bolts 118. The lock carrier 98 is fixed by means of these in the foundation pit 96. The fastening unit 106 is constructed in a similar way to the fastening unit 64 relating to the roller conveyor apparatuses 50 according to the illustration in FIG. 3.1.

The folding lock 100 is stretched out and folded away in its position illustrated in FIG. 6.1.

FIG. 6.2 shows a side view of a floor plate within an erected lock unit.

It is apparent from the illustration according to FIG. 6.2 that, in this case, the lock carrier 98 is received in the activated position on the foundation pit 96. The fixed fastening bolts 104 and the sliding bolts 118 are detained in corresponding reception orifices of the foundation pit 96. Owing to the erected side faces of the lock carrier 98, a system height is obtained, measured from the transport rollers 102 to the top side of the deck sheet 90 and identified by the reference symbol 5. The folding lock 100 is placed into a position projecting above the system height 5. In a similar way to the illustration according to FIG. 6.1, the floor plates 80, with an integrated lock carrier 98, lie on the top edge 4 of the grid structure 1 comprising longitudinal members 2 and crossmembers 3.

A top view of the floor plate, illustrated in a side view in FIGS. 6.1 and 6.2, may be gathered in more detail from the illustration according to FIG. 6.3.

It is apparent from the illustration according to FIG. 6.3 that the floor plate 80 contains a peripherally extending seat-rail box profile 82. The individual portions of the seat-rail box profile 82 are connected to one another via corner fittings 94. The lock carrier 98 is received centrally on the bottom sheet 88, above a crossmember 3 of the grid structure 1. The lock carrier 98 comprises the folding lock 100 which is movable about a lock axis 101. The lock carrier 98 can be actuated via a fastening unit 106. The fastening unit 106 comprises a release grip 120 which acts on the spring-loaded sliding bolts 118. By means of this, the lock carrier 98 can be locked and unlocked in its foundation pit 96 (cf. the illustrations in FIGS. 6.1 and 6.2). The folding lock 100 is preceded by transport rollers 102. The transport rollers 102 prevent an undesirable lowering of both military and civil pallets and containers below the system height 5 above the cargo-hold floor top edge. Moreover, the transportability of the entire cargo-hold floor is lastingly improved by means of an increased transport roller density, without additional roller conveyor apparatuses 50 having to be installed. In the lowered state of the lock carrier 98, the fastening unit 106 can be released from the foundation pit 96 with only one hand through an operating orifice on the underside via the release grip 120 prestressed by two springs. The two sliding bolts 118 move back out of the reception bores in the foundation pit 96, and, after the lock carrier 98 has been raised slightly on one side, the latter, together with the fixed fastening bolts 104, can be pulled out of the foundation pit 96 without the aid of a second hand. The then loose lock carrier 98 is reversed and is inserted, with the closed underside downward, with the fixed fastening bolts 104 into the receptacle of the foundation pit 96, and is thereafter put down on an upper bearing strip of the foundation pit 96, said upper bearing strip being arranged in the transverse direction with respect to the foundation pit 96. In this case, the sliding bolts 118 snap into the reception bores of the foundation pit 96 and detain the lock carrier 98. The fixed fastening bolts 104 and the sliding bolts 118 of the fastening unit 6 not only serve for detaining the lock carrier 98, but also for transmitting upward the horizontal and vertical holding forces which are caused by the military and civil pallets and containers. The fixed fastening bolts 104 and the sliding bolts 118 of the fastening unit 106 and also the reception bores of the foundation pit 96 are of correspondingly reinforced design.

Both for the guidance and for the detention of military or civil pallets and containers at a system height 5 above the cargo-hold floor top edge, the folding lock 100 can, as required, be erected or else folded away again, so that it is accommodated below the system height 5 in the lock carrier 98. It can rapidly be rotated, together with the latter, in the floor plate 80, in order to obtain a smooth and closed cargo-hold floor which can be walked on and driven over.

A side view of the floor plate with lashing points and with erected and countersunk roller conveyor apparatuses 50 may be gathered from the illustration according to FIG. 7.1. The illustration according to FIG. 7.1 corresponds essentially to the illustration according to FIG. 5.1, in which roller conveyor apparatuses 50 are integrated between the individual lashing point housings 12. One of the roller conveyor apparatuses 50 is in its erected position, while the other of the roller conveyor apparatuses 50 points with the roller conveyor apparatus floor 58 upward. Both roller conveyor apparatuses 50 contain the fastening unit 64 and the transport rollers 60. Both fastening units 64 can be actuated with one hand both from the top side of the roller conveyor apparatus 50 and through its floor 58. For the sake of completeness, it may be mentioned that the lashing point shaft 14 received in the lashing point housings 12 has in each case a light adaptor 24 and a light lug 20, laid in its horizontal position, for the fastening of low loads.

A top view of the floor plate according to the illustration in FIG. 7.1 may be gathered from FIG. 7.2.

The illustration according to FIG. 7.2 illustrates lashing point housings 12 fastened fixedly on the grid structure 1, a floor plate 80 with an integrated lock carrier 98 and foundation housings 52, introduced between the individual lashing point housings 12, for roller conveyor apparatuses 50. The foundation housings 52 of the roller conveyor apparatuses 50 have in each case the bearing strips 84 which are also formed on the lashing point housings 12. The floor plate 80 lies with its bottom sheet 88 on these bearing strips. The seat-rail box profile 82 is connected sealingly to the bearing strips 84 of the lashing point housing 12 and of the foundation housings 52 of the roller conveyor apparatuses 50 via installation screws 86, illustrated in the figure, which are located at the edge of the floor plate 80. The foundation housings 52 lie with their bottom surface 98 on the longitudinal members 2 of the grid structure 1 and are permanently connected to these via fastening elements 54. The same applies to the lashing point housings 12 which are screwed to the crossmembers 3 of the grid structure 1. Each of the lashing point housings 12 comprises a light lug 20 for low load which is reproduced in a horizontal position.

A connecting plate 40, spanning a plurality of lashing points 10, for fastening very heavy loads may be gathered from the illustration according to FIG. 8. It is apparent from the illustration according to FIG. 8 that the connecting plate 40 is connected via heavy additional adaptors 26 in each case to two lashing point housings 12, illustrated, and two lashing point housings 12, not illustrated in FIG. 8, of lashing points 10. Their additional adaptor 26 is connected to the lashing point shaft 14 of the lashing point housing 12 via the receptacle 16 (cf. the illustration according to FIGS. 1.1 to 2.2). The lashing point housings 12 are screwed via fastening elements 54 to the top edge 4 of the grid structure 1 comprising longitudinal members 2 and crossmembers 3. Below the connecting plate 40 is located a lock carrier 98 with a folding lock 100 which is folded in, that is to say is in its position lowered into the floor plate 80, thus resulting in a smooth cargo-hold floor surface which, in the case of FIG. 8, is covered by a connecting plate 40. With the aid of the connecting plate 40 according to the illustration in FIG. 8, loading caused by an extremely heavy load can be distributed to four lashing points 10 in the cargo-hold floor, so that the mechanical stress on a single lashing point 10 or lashing point housing 12 can be reduced considerably. It is possible, by virtue of the connecting plate 40, to introduce even very high loads into the grid structure 1 of the aircraft fuselage.

Design variants of an electromotively actuable locking system which can be used for military purposes may be gathered from the figure sequence of FIGS. 9.1 to 9.6, the lock elements illustrated there being illustrated in various operating positions.

FIG. 9.1 shows a diagrammatic illustration of the grid structure 1 comprising crossmembers 3 and longitudinal members 2, the top edge of the grid structure 1 being identified by the reference symbol 4. Below the top edge 4 of the grid structure 1 is located a collecting trough which comprises a drainage funnel 99 with an exchangeably designed filter insert. A floor plate is partially illustrated by means of fastening elements 134 on the grid structure 1.

FIG. 9.2 shows a top view of a locking unit 131 which can be used for military purposes for locking a military appliance 130. The locking unit 131 for military purposes is mounted releasably on the crossmembers 3 of the grid structure 1 of the aircraft fuselage via a housing 131.1 and a housing 132 of a guide unit 133 by means of the fastening elements 134 (cf. the illustration according to FIG. 9.1). Furthermore, the locking unit 131 is received on the lashing point housing 12 and on the foundation housings 52 and 96 and, by means of further fastening elements 135, fixedly on the longitudinal members 2 of the grid structure 1 of the aircraft fuselage. A housing cover 136 is connected to the housing 131.1 of the locking unit 131 via connecting element 137. A housing cover 138 is connected to the housing 132 of the guide unit 133 via connecting elements 137.

The locking unit 131 comprises axle bolts with torsion spring 139, which allow a lock rail 140 to rotate through 90°, the torsion springs on the axle bolts 139 causing the lock rail 140 to be erected into the operating state and to be fixed in the manually induced folded-away state by means of a detaining element 142, in such a way that the surface of the locking unit 131 is closed and can therefore be driven over. In the folded-away state, the lock rail 140 is supported on the housing 131.1 via a Z-nose 149, two detaining elements 142 and two axle bolts with torsion spring 139. For erecting the lock rails 140, both detaining elements 142 must be open simultaneously counter to a spring restoring force, thus reliably preventing an unwanted erection of the lock rails 140.

The lock rails 140 can be folded open and folded away in every possible position of the lock 143, without the functioning of the entire system being adversely influenced. Via a lock bearing shaft 144, the lock 143 is copivoted when the lock rail 140 is being erected and being folded away and, in the folded-away state, together with the lock rail 140, always closes the cargo-hold floor, regardless of whether in the locking position or in the unlocking position or even in intermediate positions.

This is possible, since the center line of a lock-stroke shaft 145 and, in the folded-away state of the lock rail 140, the center line of the then horizontal long holes 148 of the lock 143 are at all times at the same height as the center lines of the axle bolts 141 (cf. FIGS. 9.4 and 9.5).

Since a lock-stroke shaft 145 can move only horizontally by means of a spindle nut 146 driven by a horizontal threaded spindle 147, in the folded-away state of the lock rail 140 the position of the lock-stroke shaft 145 in the then horizontal long holes 148 of the lock 143 plays no part in the necessarily resulting horizontal position of the lock 143.

In the folded-away state, the lock 143 is supported, via its Z-nose 149, on the housing 131.1 and, via the lock bearing shaft 144, in the lock rail 140. Via the long hole 148, the lock 143 fixes the free end of the threaded spindle 147 in the vertical direction by means of the lock-stroke shaft 145 and the spindle nut 146.

The threaded spindle 147 is driven via a motor-driven unit 145 (FIG. 9.2). Synchronization shafts 143 extend, parallel to the longitudinal member 2 of the grid structure 1, from the motor/gear unit 155 and are coupled to the motor/gear unit 155 in each case via telescope couplings 154. A plurality of motor/gear units 155 are in each case coupled to one another via the synchronization shafts 153 with respect to the longitudinal member 2 of the grid structure 1.

In the illustration according to FIG. 9.3, the lock 143 is in its folded-away position and forms a smooth surface which can be driven over with respect to the cargo-hold floor. In the illustration according to FIG. 9.3, the lock-stroke shaft 145 is, with respect to the long hole 148, at the upper stop of the long hole 148. The drainage funnel 99 is located, in the foundation region, below the lock 143 moved into its horizontal folded-away position.

In the illustration according to FIG. 9.4, the lock 143 is illustrated, partially folded open, that is to say the lock nose 149 is lifted off from its bearing surface on the underside of the housing. The housing of the locking unit 131 is identified by the reference symbol 131.1.

It may be gathered from the illustration according to FIG. 9.5 that the lock 143, in its erected position, spans with its Z-nose 149 one edge of a pallet 156 or of another cargo article. In the illustration according to FIG. 9.5, the lock 143 stands upright in the housing 131.1 of the locking unit 131. The system height is indicated by the reference symbol 5 in the illustration according to FIG. 9.5. In the illustration according to FIG. 9.5, the spindle nut 146, driven by the gear spindle 147, is moved almost completely into the lock 143. The lock-stroke shaft 145 and the lock bearing shaft 144 are aligned with one another in the vertical direction.

The illustration according to FIG. 9.6 shows how the Z-nose 149 releases the lateral edge of the pallet 156, so that, in flight, the latter can leave the aircraft at the rear of the latter, parallel to the longitudinal members 2, when the loading gate is open. By means of the motor/gear units 155, the locking units 131 are activated in such a way that the locks 143 release the edges of the pallet 156 or of another article of military equipment, so that jettisoning of the latter can take place, unimpeded, through the open loading gate.

A front view and a top view of alternately arranged locking and guide units which can be used for military purposes may be gathered from the illustrations according to FIGS. 10.1 and 10.2.

A guide unit 133 can be rotated through 90° via axle bolts with torsion springs 139, 141. The torsion spring 139 on the axle bolts 141 causes the guide rail 152 to be erected into the operating state. In the manually induced folded-away state, said guide rail is fixed by the detaining elements 142 in such a way that the surface of the guide unit 133 is closed and can be driven over. The guide rail 152 is supported, folded away, via its Z-nose 149, the two detaining elements 142 and the two axle bolts with torsion spring 139, 142 on the housing 132 of the guide unit 133. For the erection of the guide rail 152, both detaining elements 142 must be opened simultaneously counter to a spring restoring force, thus reliably preventing an unwanted erection of the guide rail 152. Via guide rollers 150 in the lock rail 140 or in the guide rail 152, the friction during the loading or unloading of military pallets 156 or containers or other articles of equipment during flight or during loading operations is optimized in a geometrically favorable way.

The synchronization shafts 153 in the guide units 133 connect the motor/gear units 155 in the locking units 131 to one another via telescopic couplings 154. This ensures a functional synchronism of all the locks 143 in the cargo loading system, since the continuous rotary couplings of all the locking units 131 on the left and on the right side of the cargo hold are connected mechanically and positively actuated synchronously. In an emergency, actuation via a manually actuable system is also possible.

The gear spindle 147 at the output of the motor/gear unit 155 drives the spindle nut 146 forward or backward, depending on the direction of rotation, the spindle nut 146 being supported against rotation on the housing 131.1 and on the lock 143 and, via its lock-stroke shaft 145, pivoting the lock 143 mounted in the lock rail 140 via the lock bearing shaft 144. Depending on the end position of the locks 143, the military pallets or containers 156 are either locked or unlocked and consequently fixed or released in the direction of flight, that is to say parallel to the longitudinal members 2.

The decentral force introduction via the motor/gear units 155 affords a high degree of failsafety as a result of the coupling or the synchronization shafts 143. In the event of the failure of one or more motor/gear units 155, their drive function is assumed by adjacent motor/gear units 155.

If, by contrast, the cargo hold is required only partially for the transport of military pallets or containers 156, the military appliances 130 can remain secured in the remaining region of the cargo-hold floor, without the functioning of the erected locking units 131 or guide units 133 being influenced. Failsafety, synchronization and the mechanical fallback system also remain functional. Since, in closed locking units 131, the lock-stroke shaft 145 is moved in a long-hole guide 148 of the lock 143 by means of the spindle nut 146, and this long-hole guide 148 lies parallel to the gear spindle 147 on account of the folded-away lock rail 140 and the consequently also folded-away lock 143, the movement of the lock-stroke shaft 145, together with lock rail 140 and with the folded-away lock 143, is not impeded.

LIST OF REFERENCE SYMBOLS

1 Grid structure
2 Longitudinal member
3 Crossmember
4 Top edge of the grid structure
5 System height
10 Lashing point
12 Lashing point housing
14 Lashing point shaft
15 Shaft bearing
16 Receptacle
18 Plug connector
20 Light lug for low load
21 Lug eye
22 Heavy lug for heavy load
23 Receptacle for the heavy lug
24 Light additional adaptor
25 Bolt
26 Heavy additional adaptor
28 Fastening elements for the grid structure 1
30 Fastening elements for floor plates 80
32 Tread-proof filling body
40 Connecting plate
50 Roller conveyor apparatus
51 Upper part
52 Foundation housing
53 Bearing surface
54 Fastening elements for the grid structure 1
55 Drainage orifice
56 Fastening elements for the floor plate 80
57 Collecting trough
58 Roller conveyor apparatus floor surface
59 Sealing sheet
60 Transport rollers with mounting
61 Sealing strip
62 Fixed fastening bolts
63 Movable fastening bolts
64 Fastening unit
65 Release grip
66 Axis
67 Bolt
68 Cotter pin
69 Springs
70 Guides
80 Floor plate
82 Seat-rail box profile
84 Bearing strip/sealing strip
86 Installation screws
88 Bottom sheet
90 Deck sheet
92 Supporting profile
94 Corner fittings
96 Foundation pit
98 Lock carrier
99 Drainage funnel with filter insert
100 Folding lock
101 Lock axis
102 Transport rollers with mounting
104 Fixed fastening bolts
106 Fastening unit
108 Axis
110 Bolt
112 Cotter pin
114 Spring
116 Guide
118 Sliding bolt
120 Release grip
130 Military appliance
131 Locking unit
131.1 Housing locking unit 132 Housing
133 Guide unit
134 Fastening elements
135 Fastening elements
136 First housing cover
137 Connecting elements
138 Second housing cover
139 Torsion spring
140 Lock rail
141 Axle bolt
142 Detaining elements
143 Lock
144 Lock bearing shaft
145 Lock-stroke shaft
146 Spindle nut
147 Gear spindle
148 Long hole
149 Z-nose
150 Guide rollers
152 Guide rail
153 Synchronization shaft
154 Telescope coupling
155 Motor/gear unit
156 Pallet, cargo article

The invention claimed is:

1. A cargo-hold floor for aircraft, which is received on a grid structure comprising longitudinal members and crossmembers and in which are provided exchangeably arranged floor plates, roller conveyor apparatuses and also lashing point housings with lashing points for the fastening of cargo articles, such as pallets, containers or vehicles and articles of equipment, and with locking units which comprise lock elements capable of being folded open and of being folded away, the lashing point housings being received in a stationary manner on the grid structure at intersection points of the longitudinal members with the crossmembers, characterized in that
tread-proof elastic filling bodies are contained in the lashing point housings,
both roller conveyor apparatuses integrated into the cargo-hold floor and locking units can be received in an erected operating position and in a countersunk drive-over and stowage position at an installation location which always remains the same in the cargo-hold floor, and wherein
the roller conveyor apparatuses and the locking units have smooth bottom surfaces which can be driven over or walked on in the countersunk drive-over and stowage position of the roller conveyor apparatuses and of the locking units.

2. The cargo-hold floor as claimed in claim 1, characterized in that the roller conveyor apparatuses and the locking units can be transferred, without a tool, from their erected operating position into their countersunk drive-over and stowage position.

3. The cargo-hold floor as claimed in claim 2, characterized in that the lashing point housings and foundation housings of roller conveyor apparatuses have bearing strips for floor plates and/or locking units, said bearing strips being in alignment with a top edge of the grid structure.

4. The cargo-hold floor as claimed in claim 2, characterized in that the lashing point housings contain a lashing point shaft, on which a receptacle allows the fastening of lugs or additional adaptors by means of a plug connector.

5. The cargo-hold floor as claimed in claim 4, characterized in that the lugs in the lashing point housings can be moved omnidirectionally about two intersecting axes mounted in each case on both sides.

6. The cargo-hold floor as claimed in claim 3, characterized in that floor plates can be fastened exchangeably via fastening elements to bearing strips of the lashing point housings and to the bearing strips of the foundation housings of the roller conveyor apparatuses so as to overlap these bearing strips.

7. The cargo-hold floor as claimed in claim 6, characterized in that the locking units are integrated into the floor plates.

8. The cargo-hold floor as claimed in claim 1, characterized in that the roller conveyor apparatuses have foundation housings which are connected to the grid structure via fastening elements, and the foundation housings contain bearing surfaces, on which upper parts of the roller conveyor apparatus lie in the countersunk drive-over and stowage position.

9. The cargo-hold floor as claimed in claim 1, characterized in that the locking units comprise foundation pits, into which the locking units can be received in the countersunk drive-over and stowage position.

10. The cargo-hold floor as claimed in claim 6, characterized in that the floor plates have a seat-rail box profile which, on its top side delimiting the cargo-hold floor, has a reception profile, running peripherally around the floor plate, for the detention of articles of equipment.

11. The cargo-hold floor as claimed in claim 1, characterized in that a plurality of the lashing points of the cargo-hold floor can be covered with a connecting plate having a force engagement point, the connecting plate being connected to these lashing points via heavy additional adaptors.

12. The cargo-hold floor as claimed in claim 1, characterized in that the roller conveyor apparatuses and/or the locking units have a fastening unit, a release grip of which is accessible both from the underside and from the top side of the roller conveyor apparatuses or of the locking units.

13. The cargo-hold floor as claimed in claim 1, characterized in that a system height between the top side of the floor plate and top sides of the roller conveyor apparatuses located in the erected operating position amounts to approximately 30 mm.

14. The cargo-hold floor as claimed in claim 3, characterized in that the foundation housings of the roller conveyor apparatuses have drainage orifices which are arranged below the top edge of the grid structure.

15. The cargo-hold floor as claimed in claim 14, characterized in that, below the top edge of the grid structure, drainage funnels are arranged, which have an exchangeable filter insert, extractable after the removal of a floor plate.

16. The cargo-hold floor as claimed in claim 14, characterized in that collecting troughs for drainage fluid are arranged below the top edge of the grid structure and have a trough bottom running at an inclination from the drainage orifices to the drainage funnel.

17. The cargo-hold floor as claimed in claim 1, characterized in that locking units and guide units which can be used for military purposes are arranged parallel to the longitudinal members of the grid structure, the locking units which can be used for military purposes being assigned a motor/gear unit actuating the lock.

18. The cargo-hold floor as claimed in claim 17, characterized in that locks of the locking units which can be used for military purposes have a long-hole guide through which passes a lock-stroke shaft about which the lock can be actuated by means of a gear spindle.

19. The cargo-hold floor as claimed in claim 17, characterized in that the motor/gear units received in alternating sequence parallel to the longitudinal members of the grid structure and actuating the locks are coupled to one another via synchronization shafts.

20. The cargo-hold floor as claimed in claim 19, characterized in that the synchronization shafts for further motor/gear units are coupled to adjacent motor/gear units in each case via telescope couplings.

21. A cargo-hold floor for aircraft, which is received on a grid structure comprising longitudinal members and crossmembers and in which are provided exchangeably arranged floor plates, roller conveyor apparatuses and also lashing point housings with lashing points for the fastening of cargo articles, such as pallets, containers or vehicles and articles of equipment, and with locking units which comprise lock elements capable of being folded open and of being folded away, the lashing point housings being received in a stationary manner on the grid structure at intersection points of the longitudinal members with the crossmembers, characterized in that the lashing point housings contain a lashing point shaft, on which a receptacle allows the fastening of lugs or additional adaptors by means of a plug connector, both roller conveyor apparatuses integrated into the cargo-hold floor and locking units can be received in an erected operating position and in a countersunk drive-over and stowage position at an installation location which always remains the same in the cargo-hold floor, and wherein the roller conveyor apparatuses and the locking units have smooth bottom surfaces which can be driven over or walked on in the countersunk drive-over and stowage position of the roller conveyor apparatuses and of the locking units.

* * * * *